United States Patent [19]

Muscat

[11] Patent Number: 4,626,021
[45] Date of Patent: Dec. 2, 1986

[54] CONVERTIBLE TOP COVER

[76] Inventor: Peter P. Muscat, 14980 Waterfall Rd., Northville, Mich. 48167

[21] Appl. No.: 720,742

[22] Filed: Apr. 8, 1985

[51] Int. Cl.⁴ .............................................. B60J 7/12
[52] U.S. Cl. .................................................. 296/107
[58] Field of Search ......... 296/107, 108, 109, 111–117

[56] References Cited

U.S. PATENT DOCUMENTS

| 1,828,355 | 10/1931 | Bulkeley | 296/107 |
| 2,580,337 | 12/1951 | Votypka | 296/107 |
| 2,765,192 | 10/1956 | Blake | 296/107 |

*Primary Examiner*—Robert R. Song
*Attorney, Agent, or Firm*—John R. Benefiel

[57] ABSTRACT

A convertible top cover is disclosed formed of single piece seamless front and rear panels having adjacent edges secured along an intermediate top frame bow member extending across the passenger compartment. The front and rear panel adjacent edges are secured within a recess in the bow frame member by a retainer member fit into the bow frame member, with a exterior trim covering fit over the retainer member. The intermediate bow member extends alongside and immediately to the rear of the side glass on either side of the vehicle, and a projecting lip formed by a sandwiched sheet metal layer enclosed in the trim covering provides an aerodynamic fairing of the window seal to the rear panel. The separate front and rear panels are of different colored fabric to produce a two tone styling.

5 Claims, 8 Drawing Figures

CONVERTIBLE TOP COVER

BACKGROUND OF THE INVENTION

This invention concerns convertible tops and more particularly the fabric covering for foldable convertible top vehicles. A conventional construction for the top cover is a central panel extending front to rear, a pair of sewn side panels along either side of the top frame and adjacent the side glass areas. The sewn together construction of prior art convertible coverings has several disadvantages.

Firstly, the sewing required creates a greater expense due to the added labor involved in sewing the various pieces together. The presence of the sewn seams also creates potential leakage and weakness as well as reducing slightly the aesthetic appearance of the installed covering.

Secondly, this sewn-together construction makes impossible the replacement of damaged portions of the top if a section of the top is damaged, and thus requires replacement of the entire top.

Other disadvantages is that the length wise seams preclude a variation in coloring between front and rear sections of the top covering for two tone styling.

Another disadvantage in the conventional construction is created by the edges of the top covering adjacent the side glass areas. While the top covering side edges may readily be drawn tightly to the top frame side members as by means of cables or other stretching arrangements, the curved section of top adjacent the side glass areas cannot be readily drawn tight. The loose edge presents a projecting cove shaped surface facing the direction of travel of the vehicle such as to create a large aerodynamic drag, as well as an unattractive appearance.

Accordingly, it is an object of the present invention to provide a top covering for convertibles which minimizes the sewing required as well as the number of separate pieces of fabric needed to form a complete top covering.

It is a further object of the present invention to provide a top covering construction in convertible top covering construction in which replacement of separate panels is possible in order to repair damaged sections of the top.

It is still another object of the present invention to provide a convertible top construction which allows a two tone styling of the convertible top.

It is still another object of the present invention to provide a convertible top covering which provides an aerodynamic fairing of the top edges adjacent and immediately to the rear of the side glass areas of the passenger compartment.

Still another object of the present invention to eliminate exposed seams in a convertible top covering.

SUMMARY OF THE INVENTION

These and other objects of the present invention which will become apparent upon a reading of the following specification and claims are achieved by a top cover arrangement formed by front and rear panels each consisting of a single section of fabric which extend to meet along an intermediate bow frame member extending transversely across the passenger compartment immediately to the rear of the side window areas of the vehicle. These adjacent edges of the top covering are secured to the bow frame by being received into a recess in the bow frame, and a retainer member having a rib projecting into the recess is attached to compress the adjacent panel edges. An exterior trim covering is placed over the retainer member providing an aesthetically appealing transition between the front and rear panels. This construction facilitates two tone styling of the convertible top since different material may be used for the front and rear panels.

The retainer member includes a sheet metal layer forming a lip in the area adjacent the side glass and is enclosed in the exterior trim covering. The lip extends over the window seal and thereby provides an aerodynamic fairing transitioning the side glass window areas into the rear panel.

The front and rear sections are secured to other parts of the convertible top frame in conventional fashion, the front panel section anchored to the convertible top header frame member and drawn taut as by means of a hem enclosed cable extending along either side edge of the convertible top frame. The rear panel is secured to the rear window and adjacent body sections also in conventional fashion. This two piece construction allows ready replacement of either of the front or rear panel to repair and completely eliminates exposed sewn seams, to thereby accomplish the above recited objects of the invention.

DETAILED DESCRIPTION

In the following detailed description certain specific terminology will be employed for the sake of clarity and the particular embodiment described in accordance with the requirements of 35 USC 112, but it is to be understood that the same is not intended to be limiting and indeed should not be so construed inasmuch as the invention is capable of taking many forms and variations within the scope of the independent claim.

Figures 1, 6:
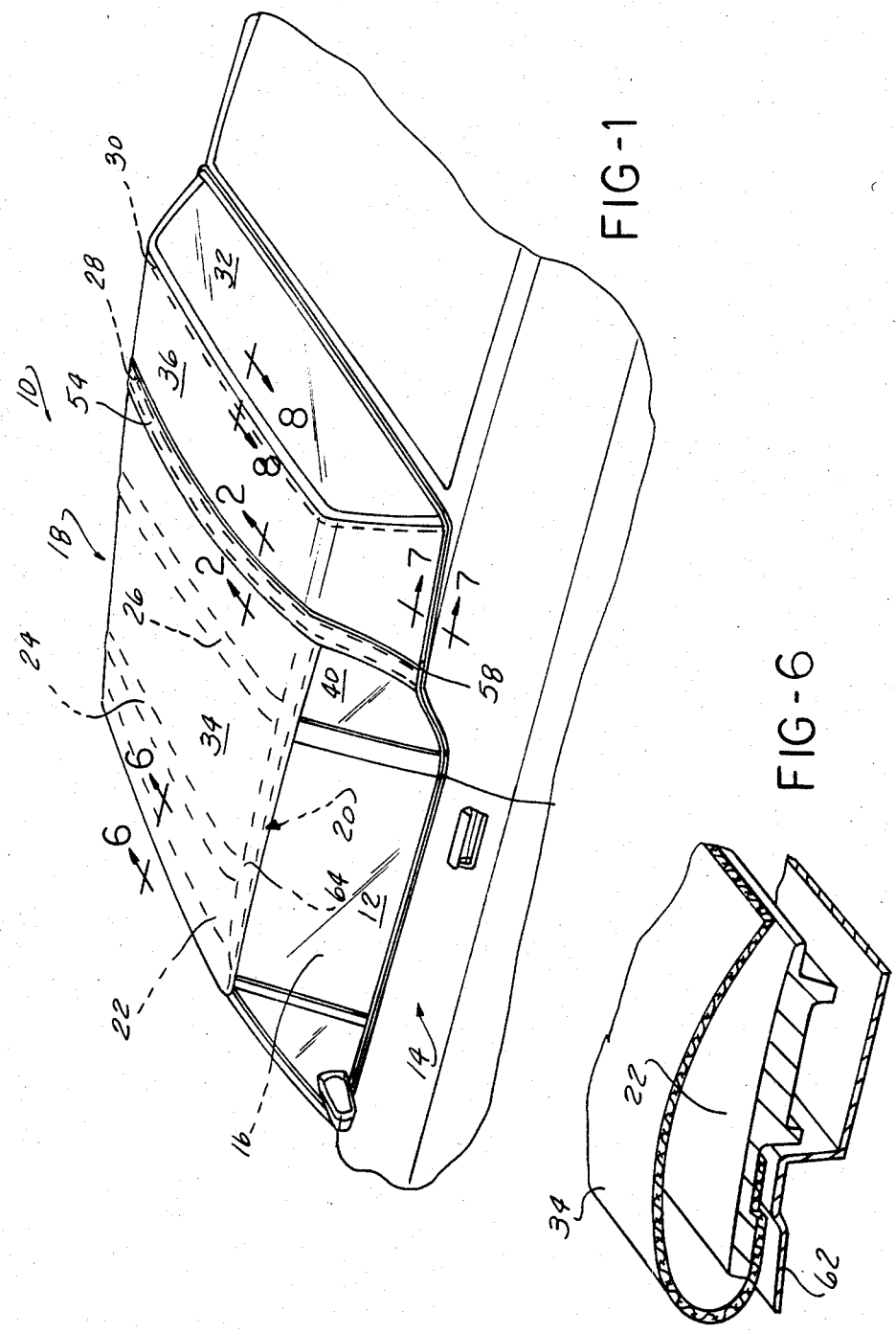
FIG. 1, is a fragmentary view of a convertible top automobile in perspective showing the top covering according to the present invention.
FIG. 6, is a fragmentary sectional view of the header connection of the top covering according to the present invention.

Referring to the drawings, and particularly FIG. 1, a convertible top automobile 10 is depicted which includes a body 14 together with glass areas 12 defining a passenger compartment 16, the passenger compartment covered by the top cover arrangement 18 according to the present invention enclosing the upper and rear areas of the passenger compartment 16.

The convertible top cover is stretched over a convertible top frame 20 partially shown in hidden lines in FIG. 1, including a plurality of bow frame members extending transversely across the passenger compartment 16. The bow frame members including a header member 22 at the front, and a plurality of intermediate bow frame members 24,26,28, and a framing member 30 surrounding a generally vertically disposed rear window glass 32, extending substantially entirely across the width of the passenger compartment 16.

The convertible top frame 20 is adapted to be folded into a storage space within the vehicle in the manner well known to those skilled in the art in order to provide a "convertible" automobile. Inasmuch as the convertible top frame 20 does not of itself comprise the present invention, the complete details thereof are not here set out.

Reference is made to copending application Ser. No. 605,070, filed on Apr. 30, 1984, for a convertible top frame of a general type suitable for use with the top covering arrangement according to the present invention, although varying in some details from that partially shown in FIG. 1.

The top cover 18 according to the present invention is comprised of a pair of single pieces of fabric, a front panel 34 and a rear panel 36. The front panel 34 and rear panel 36 together extend substantially completely over the passenger compartment 16 with the edges along the intermediate bow member 28 contiguous to each other.

Figure 2:
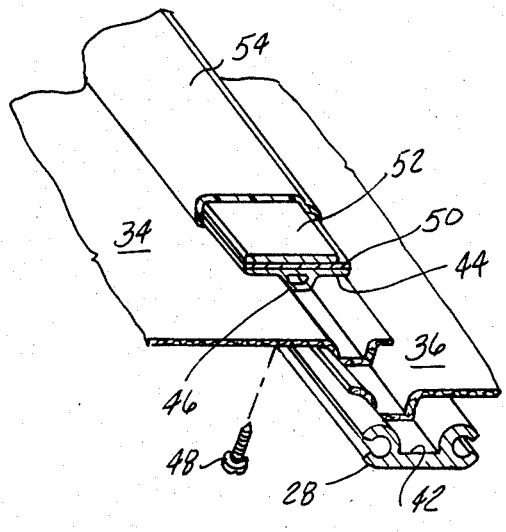
FIG. 2, is a perspective fragmentary view of the section 2—2 taken in FIG. 1.

The bow member 28 extends just to the rear of the side glass areas 40 on either side of the passenger compartment 16. As seen in FIG. 2, the intermediate bow member 28 is comprised of metal extrustion shape or section having a longitudinal recess 42 extending along the length thereof with the adjacent edges of the front panel 34 and the rear panel 36 lapped together therein. These edges are secured together in the recess 42 by means of a retainer member 44 having a longitudinally extending central ridge formed of a metal extrusion. The central ridge 46 is hollow to be able to accept threaded fasteners 48 first passing through the bow member 28 and to securely clamp the lapping edges of the front panel 34 and the rear panel 36.

A strip of thin sheet metal is spot welded atop the retainer member 44 with a cushioning strip of cardboard 52 disposed atop the sheet metal strip 50 and slightly offset at the rear in order to streamline the exposed shape. The retainer member 44, sheet metal strip 50, and the cardboard strip 52 are all enclosed by a cover of trim material 54 such as vinyl in order to provide a finished appearance to the exposed exterior of this assembly. The trim cover 54 may be of suitable matching or contrasting color to the fabric of the panels 34 or 36. Layers of glue may also be provided intermediate the contacting lapped surfaces of the front panel 34 and the rear panel 36, the recess 42, and retainer member ridge 46 to seal and secure the assembly together.

In this construction, the front and rear panels 34 and 36 may therefore be replaced separately to enable lower cost repair.

The fabric material of the respective front and rear panels may also be of different shading or texture, such as to provide an effective two tone appearance with the transition between being pleasingly demarked by the exterior trim cover 54. A protruding lip 60 of the strip 50 and the exterior trim cover 54 are utilized to provide an aerodynamic fairing of the areas adjacent the side glass panels 40 on either side of the passenger compartment 16.

Figure 3:
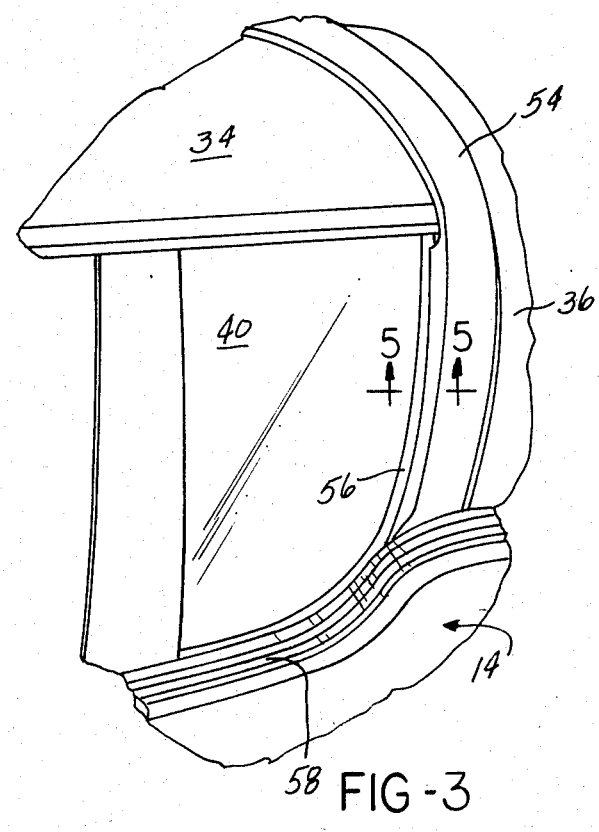
FIG. 3, is a perspective fragmentary view of the rear window and adjacent top covering portions of the vehicle shown in FIG. 1.
Figure 5:
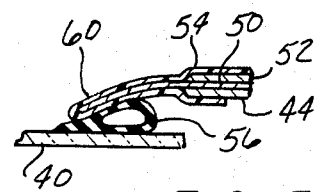
FIG. 5, is a section taken along the lines 5—5 in FIG. 3.
Figure 4:
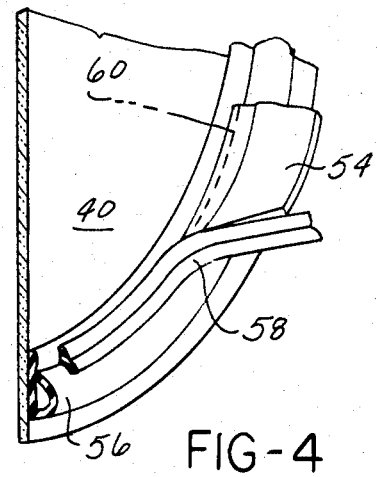
FIG. 4, is an enlarged sectional view of the side window and seals shown in FIG. 3.

As can be seen in FIGS. 3 and 4, a glass pane 40 is provided with a bonded inner rubber seal 56 mating with an outer rubber seal 58 secured to the adjacent body areas. The metal frame member extends downwardly immediately adjacent to the rear regions of the rear glass side glass 40 and the sheet metal strip 50 extends outwardly in this region (see FIG. 5) to form a lip 60 which is encased in the vinyl trim covering 54 as shown. This provides an aerodynamic fairing to provide a smooth air flow over the transition from the rear edge of the side glass 40 onto the rear section of rear panel 36.

The securement of the front panel 34 and rear panel 36 to other portions of the top frame may be of conventional construction as for example in FIG. 6, the front panel 34 is looped and extended around the front header member 22 and inserted beneath a header trim panel 62 in order to be securely retained as shown in FIG. 6.

Figure 7:
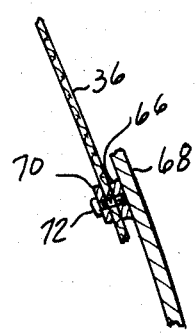
FIG. 7, is a view of the section 7—7 taken through the rear body depicting the connection of the rear panel thereto.

The side edges of the front panel 34 are preferably retained against the side members 64 of the top frame 20, by means of a cable passing through a side hem sewn into the front panel 34, not shown inasmuch as such arrangements are well known to those skilled in the art. The rear panel 36 is secured within the quarter panel as shown in FIG. 7, by a first metal strip 66 welded to the inside surface of the body panel 68; and a clamping member 70 secured thereto by metal fasteners 72. The lower edge of the rear panel 36 is thus secured therebetween as shown.

Figure 8:
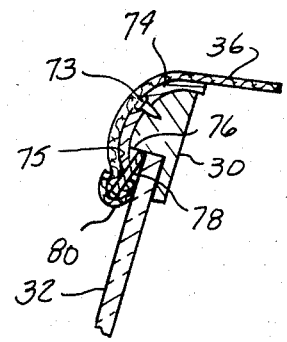
FIG. 8, is a view of the section 8—8 taken through the rear glass window panel of the convertible top covering shown in FIG. 1.

The rear panel 36 is also secured to the rear window frame 30 as shown in FIG. 8. A curved retainer member 74 is secured with screws 75 to the frame 30, and has a terminal lip portion 75 projecting past shoulder 76 of the frame 30.

The trailing edge of rear panel 36 has affixed thereto a plastic clip 78, sewn into a double hem piece 80. The clip 78 is retained by being snapped beneath terminal portion 75 to be retained thereby.

Accordingly, it can be appreciated that the above recited objects of the present invention are achieved by the top covering arrangement described in that the exposed sewn seams are entirely eliminated. Separately replaceably panels constitute the entire covering of the passenger compartment such that this may be replaced separately and also constructed of fabric material of different shades, textures, etc., to provide a two tone styling for the convertible top.

The elimination of the sewn seams renders the cost lower as well as eliminating the points of weakness and leakage represented by such seams. The aerodynamic fairing achieved at the rear of the side window areas improves the overall aerodynamic efficiency as well as the aesthetics of the rear window treatment of the convertible top covering. The overall aesthetic appeal of the design is good utilizing the exterior trim cover 54 as a styling feature.

I claim:

1. A convertible top covering for a convertible automobile vehicle body having a foldable frame enclosing a passenger compartment of said vehicle body, said foldable frame comprised of a header frame member extending across the front of said top frame and a plurality of top frame bow members extending transversely across the passenger compartment of said vehicle, said top covering comprising:

a front panel comprising of a single piece of fabric extending completely over said foldable frame from one of said intermediate bow members forwardly and attached to said header frame;

attachment means securing the rear edge of said front panel along said one of intermediate bow members;

a rear panel comprising a single piece of fabric extending completely over said foldable frame from said one of said intermediate bow members rearwardly thereof, and secured to adjacent portions of said vehicle body; said attachment means also attaching said rear panel to said one of said intermediate bow member; said attachment means including a recess formed in said one intermediate bow frame member receiving the adjacent edges of each of said front and rear panels and further including an elongated retainer member fit into and secured in said recess to there by attach said front and rear panels; said retainer member extending substantially the entire length of intermediate bow frame member;

said retainer member including a hollow ridge portion extending into said recess and wherein said attachment means includes screw fasteners extending through said one of said intermediate bow member and into said ridge.

2. The top covering according to claim 1 further including a rigid glass panel extending substantially entirely across the rear of said vehicle passenger compartment, and wherein said rear panel is secured thereto about the upper edge thereof.

3. The top covering according to claim 1 wherein said front and rear panels are comprised of differently colored fabric material.

4. A convertible cover for a convertible automobile vehicle body having a foldable frame enclosing a passenger compartment of said vehicle body, side windows on either side of said passenger compartments each having a rear edge located to the rear of said passenger compartment, said foldable frame comprised of a header frame member extending across the front of said top frame and a plurality of top frame bow members extending transversely across the passenger compartment of said vehicle, an intermediate one of said bow members substantially aligned with said rear edges of said side windows, said top covering comprising:

a front panel comprising of a single piece of fabric extending completely over said foldable frame from a rear edge disposed over one of said intermediate bow members forwardly and attached to said header frame;

attachment means securing the rear edge of said front panel along said one of said intermediate bow members;

a rear panel comprising a single piece of fabric extending completely over said foldable frame from a forward edge disposed over said one of said intermediate bow members rearwardly and downwardly along to the rear edge of each of said side windows, and secured to adjacent portions of said vehicle body; said attachment means also attaching said forward edge of said rear panel to said one of said intermediate bow members;

a trim member extending over said one intermediate bow member, said forward edge of said rear panel and said rear edge of said forward panel, said trim member formed with a fairing lip extending therefrom adjacent each of said side windows inclined towards said windows to provide an aerodynamic fairing transition from said side windows to said rear panel.

5. The top covering according to claim 4 further including a seal affixed to each of said side windows rear edge, and wherein each of said fairing lips extend over said a respective seal.

* * * * *